(12) United States Patent
Ould et al.

(10) Patent No.: US 7,866,056 B2
(45) Date of Patent: Jan. 11, 2011

(54) CALIBRATION METHOD AND APPARATUS

(75) Inventors: John Charles Ould, Backwell Farleigh (GB); Alexander Tennant Sutherland, Edinburgh (GB)

(73) Assignee: Renishaw PLC, Wotton-Under-Edge (GB)

(*) Notice: Subject to any disclaimer, the term of this patent is extended or adjusted under 35 U.S.C. 154(b) by 0 days.

(21) Appl. No.: 12/449,148

(22) PCT Filed: Feb. 18, 2008

(86) PCT No.: PCT/GB2008/000528
§ 371 (c)(1),
(2), (4) Date: Jul. 24, 2009

(87) PCT Pub. No.: WO2008/102109
PCT Pub. Date: Aug. 28, 2008

(65) Prior Publication Data
US 2010/0018069 A1    Jan. 28, 2010

(30) Foreign Application Priority Data
Feb. 22, 2007    (GB) ................... 0703423.4

(51) Int. Cl.
*G01B 5/004* (2006.01)
*G01D 21/00* (2006.01)
(52) U.S. Cl. ........................ 33/503; 33/556
(58) Field of Classification Search ............. 33/502, 33/503, 504, 556–561
See application file for complete search history.

(56) References Cited

U.S. PATENT DOCUMENTS

| | | | |
|---|---|---|---|
| 4,084,323 A | 4/1978 | McMurtry | |
| 4,814,998 A | 3/1989 | Aramaki | |
| 5,125,261 A * | 6/1992 | Powley | 33/502 |
| 5,425,180 A | 6/1995 | Breyer | |
| 6,044,569 A | 4/2000 | Ogihara et al. | |
| 6,112,423 A * | 9/2000 | Sheehan | 33/502 |
| 6,434,846 B1 * | 8/2002 | McMurtry et al. | 33/502 |
| 6,601,311 B2 * | 8/2003 | McMurtry et al. | 33/502 |

(Continued)

FOREIGN PATENT DOCUMENTS

DE    10 2005 011 285 A1    12/2005

(Continued)

*Primary Examiner*—Yaritza Guadalupe-McCall
(74) *Attorney, Agent, or Firm*—Oliff & Berridge PLC

(57) ABSTRACT

A method is described for calibrating apparatus including a measurement probe mounted on a machine, such as a machine tool. The machine is arranged to capture machine position data indicative of the position of the measurement probe and the measurement probe is arranged to capture probe data indicative of the position of a surface relative to the measurement probe. The measurement probe may be an analogue or scanning probe having a deflectable stylus. The first step of the method involves moving the measurement probe at a known speed relative to an artefact whilst capturing probe data and machine position data. In particular, the measurement probe is moved along a path that enables probe data to be captured that is indicative of the position of two or more points on the surface of the artefact relative to the measurement probe. A second step of the method comprises analyzing the machine position data and the probe data and determining from that data the relative delay in capturing probe data and machine position data (i.e. the so-called system delay).

21 Claims, 5 Drawing Sheets

U.S. PATENT DOCUMENTS

Figure 1:
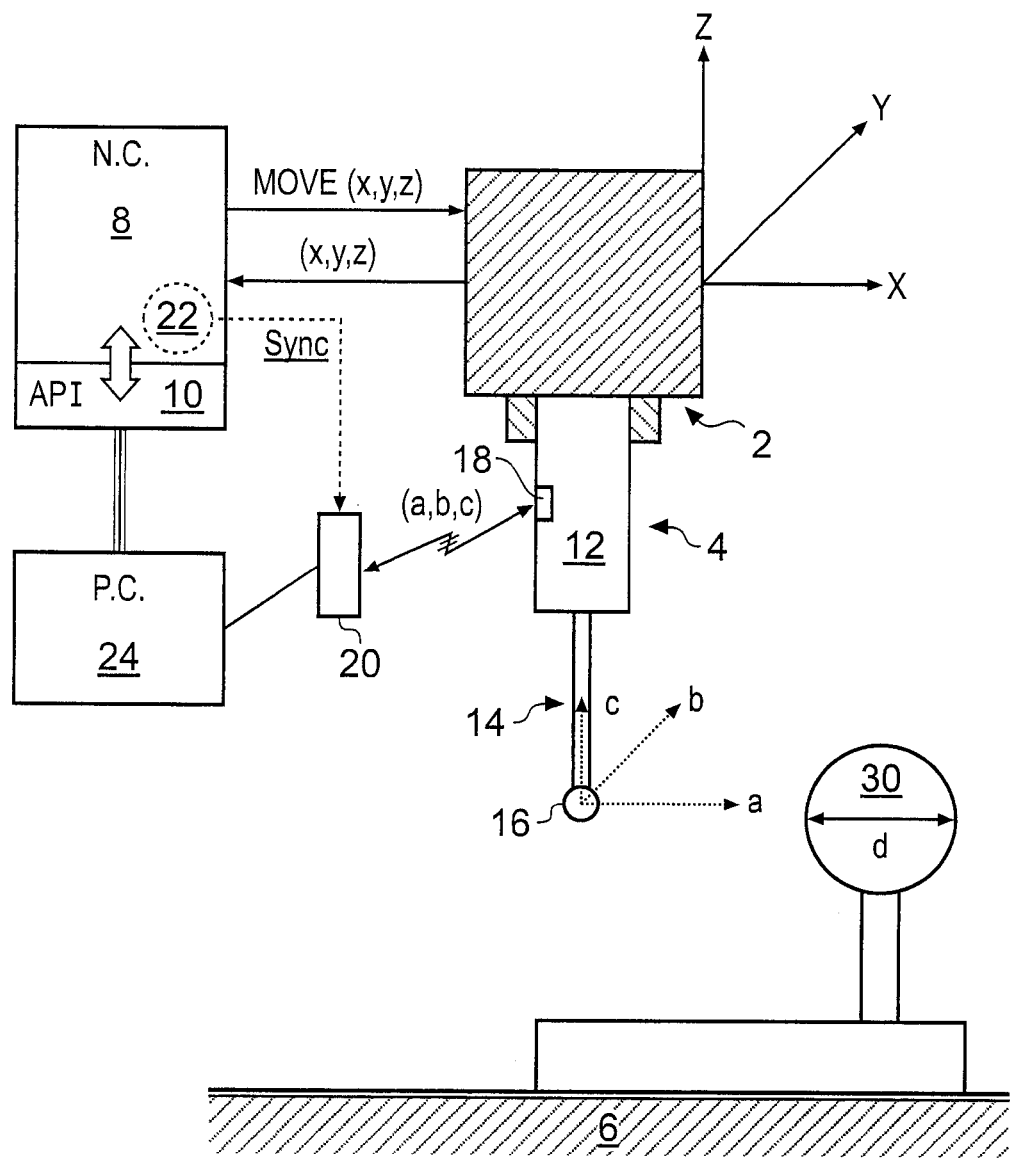

| | | |
|---|---|---|
| 6,701,268 B2 * | 3/2004 | Noda et al. .................... 33/503 |
| 6,810,597 B2 | 11/2004 | Grzesiak et al. |
| 6,909,983 B2 * | 6/2005 | Sutherland .................... 33/503 |
| 7,055,367 B2 * | 6/2006 | Hajdukiewicz et al. ....... 33/503 |
| 7,246,448 B2 * | 7/2007 | Lotze .......................... 33/559 |
| 7,788,818 B1 * | 9/2010 | Tran et al. ..................... 33/502 |
| 2002/0174555 A1 * | 11/2002 | McMurtry et al. ............. 33/502 |
| 2003/0009257 A1 * | 1/2003 | Sutherland et al. .......... 700/195 |
| 2004/0093179 A1 * | 5/2004 | Sutherland ................... 702/104 |
| 2006/0117587 A1 * | 6/2006 | Lotze .......................... 33/559 |
| 2007/0245584 A1 | 10/2007 | Hagl et al. |
| 2009/0307915 A1 * | 12/2009 | Sutherland ................... 33/502 |

FOREIGN PATENT DOCUMENTS

| | | |
|---|---|---|
| EP | 0 420 416 A2 | 4/1991 |
| EP | 0 599 513 A1 | 6/1994 |
| GB | 2 328 025 A | 2/1999 |
| WO | WO 00/62015 A1 | 10/2000 |
| WO | WO 2004/005849 A1 | 1/2004 |
| WO | WO 2005/059471 A1 | 6/2005 |
| WO | WO 2005/065884 A2 | 7/2005 |
| WO | WO 2006/013387 A2 | 2/2006 |

* cited by examiner

CALIBRATION METHOD AND APPARATUS

The present invention relates to a method for calibrating apparatus that comprises a measurement probe mounted on a machine, such as a machine tool. In particular, the invention relates to a method of determining the relative delay in capturing measurement probe data and machine position data in such apparatus.

Measurement probes are known that have a stylus or feeler for contacting an object and transducers within the probe body that measure any deflection of the stylus relative to the probe body. These measurement probes are typically termed "analogue" or "scanning" probes; an example of such a measurement probe is described in U.S. Pat. No. 4,084,323 (McMurtry). In use, the body of the scanning probe is mounted to a machine and moved relative to the surface of the object such that the stylus scans the object surface. Readings are taken of the outputs of the measurement probe transducers (i.e. to monitor stylus deflection) and of the position of the probe body within the working space of the machine. Combining the probe deflection data and machine position data captured during the scan allows the position of the workpiece surface to be found at a very large number of points throughout the scan.

Analogue or scanning probes of the type described above are typically arranged to produce a stream of probe deflection readings that provide a measure of the position of points on the surface of an object relative to the probe housing. It should be noted that such measurement probes are quite distinct to so-called touch probes or touch trigger probes that act merely as a switch and issue a so-called trigger signal whenever stylus deflection exceeds a certain threshold. In a touch trigger probing system, the trigger signal is used to freeze the measurement scales of the machine carrying the probe thereby allowing the position of the probe to be found when the deflection threshold is exceeded. For touch probes, it is known to determine a so-called probe delay that accounts for the fact that there is a time lag between the stylus of the touch probe being physically deflected beyond a deflection threshold at time T1 and the scales of the machine being frozen at a time T2. Various calibration techniques for finding the touch probe delay (T2-T1) are known; for example see GB2328025, EP420416 and U.S. Pat. No. 5,425,180.

In dedicated co-ordinate measurement machines (CMMs) that use scanning probes, the probe position information from the position encoders of the machine and the stylus deflection data from the measurement probe are both captured at high speed. The probe deflection and probe position data can thus be easily combined to produce object co-ordinate measurements in almost real time. In U.S. Pat. No. 6,810,597, calibration techniques for removing various static and dynamic errors that may occur in such apparatus are described. U.S. Pat. No. 6,810,597 also describes a technique for determining any delays within the probe (e.g. electronic processing delays) that may delay generation of the probe deflection data.

It is also known to mount a scanning probe in the spindle of a standard numerically controlled machine tool. In such a machine tool, the numeric controller (NC) receives positional information from various position encoders. The primary purpose of the machine tool positional information (e.g. x,y,z measurements of spindle position) is to allow the NC to precisely control machine movements using servo-controlled feedback loops. This positional information can also be output by the NC and combined with probe (stylus deflection) measurements to determine co-ordinate measurements of objects. To provide better synchronisation of the machine position and probe measurements, WO2005/065884 describes a master clock arrangement that produces a common timing signal for both probe deflection and machine position data.

According to a first aspect of the present invention, a method is provided for calibrating apparatus comprising a measurement probe mounted on a machine, the machine being arranged to capture machine position data indicative of the position of the measurement probe relative to an artefact, the measurement probe being arranged to capture probe data indicative of the position of a surface relative to the measurement probe, the method comprising the steps of;

(i) moving the measurement probe at a known speed relative to the artefact whilst capturing probe data and machine position data, the measurement probe being moved along a path that enables probe data to be captured that is indicative of the position of two or more points on the surface of the artefact relative to the measurement probe; and (ii) analysing the machine position data and the probe data captured during step (i) and determining therefrom the relative delay in capturing probe data and machine position data.

A method is thus provided that can be used to establish the so-called system delay (i.e. the relative delay in capturing probe data and the machine position data) in apparatus that comprises a measurement probe mounted on a machine. The method comprises a first step (i) of moving the measurement probe at a known, preferably substantially constant, speed relative to an artefact whilst collecting machine position data values from the machine tool and probe data values from the probe. The speed may be known actual speed (e.g. measured speed) or known commanded speed (i.e. the speed at which the probe was instructed to move). During this first step, the measurement probe is driven along a scanning path that is selected so that probe data can be acquired that is indicative of the position of two or more points on the surface of the artefact relative to the measurement probe.

As described in more detail below, the different delays associated with generating machine position data and probe data (e.g. due to different delays in the measurement probe and machine electronics) can mean that there is a relative delay (a so-called "system delay") between the machine position data values captured by the machine and the probe data value captured by the apparatus. This system delay can be better understood by remembering that, at a particular instant in time, the probe will measure a single point on the surface of the artefact. For example, in the case of a contact measurement probe having a deflectable stylus, the stylus will touch a single point on the surface of the artefact at a single instant in time. At that single instant in absolute time, there will thus be a certain (unambiguous) stylus deflection and the machine will be holding the probe in certain (unambiguous) position. The combination of the stylus deflection and the machine position at that single instant in time would yield the precise position of a single point on the surface. However, for a real system, the time taken for the probe to capture the stylus deflection information is typically different to the time taken for the machine to capture information relating to the position of the probe. Probe data and machine position data captured by the probe and machine at the same point in time will thus correspond to slightly different absolute times (and hence positions) of measurement. Put another way, there is a relative (absolute) timing delay between the probe data values captured by the probe and the machine data values captured by the machine; such a delay is termed herein the system delay.

By moving the measurement probe at a known speed during data acquisition in the manner described above, it has been found that the system delay can be established by the second step (ii) of analysing the captured machine position data and probe data. This analysis step may include, for example, monitoring certain common characteristics of the machine position data and the probe data as the artefact is scanned or by assessing the effect of the system delay on certain measured dimensions or properties of the artefact.

It is also important to note that the system delay found using the method of the present invention is quite different to the touch probe delay that is established in touch trigger probing systems. As explained above, the touch probe delay (T2-T1) is the delay between stylus deflection exceeding the predetermined threshold and the machine scales being frozen. The system delay found in accordance with the present invention is, in contrast, a relative delay between the capture of two sets of measurements (i.e. the machine position data and the probe data). For example, consider a (contact) scanning probe that, at a certain instant in time T1, has a stylus that is deflected by a certain amount (a,b,c) and is located at a position (x,y,z) in space. A first delay in reading the machine scales (i.e. capturing the machine position data) means that machine position data for time T1 is actually captured at a subsequent instant T2. Similarly, a second delay in obtaining the probe deflection data means that probe deflection data for time T1 is actually captured at a subsequent instant of time T3. The system delay established in accordance with the present invention is not the delay between capturing the machine position data at time T2 and the actual measurement time T1 nor is it the delay between capturing the probe data at time T3 and the actual measurement time T1. Instead, the system delay found in accordance with the present invention provides measure of the relative delay between capturing the machine position data and the probe data; i.e. T2-T3 is established. The system delay is not a delay relative to the actual time of measurement (T1) and it can be seen that the system delay determined in accordance with the present invention is quite different to the probe delay previously found for touch trigger probe systems.

The machine conveniently comprises a machine tool. Advantageously, the machine tool captures the machine position data as sets of Cartesian (x, y, z) co-ordinate values. The measurement probe may comprise a contact or non-contact (e.g. optical) measurement probe. Advantageously, the measurement probe is a so-called scanning or analogue probe having a deflectable stylus. In such a case, the captured probe data is advantageously indicative of stylus deflection and may comprise sets of Cartesian (a, b, c) co-ordinate values. If a scanning probe is provided, step (i) preferably comprises using the machine to move the measurement probe along a path that causes the stylus of the measurement probe to be brought into contact with each of said two or more points on the surface of the artefact.

If a scanning probe having a deflectable stylus is provided, step (i) conveniently comprises continuing movement of the measurement probe relative to the artefact for a limited distance (e.g. until an upper stylus deflection limit is reached) after initial contact between the stylus and a point on the surface of the artefact has been made. In this manner, probe data and machine position data are collected as the stylus tip is immobilised at a fixed point on the artefact surface and the body of the measurement probe is driven towards and then away from the artefact thereby increasing and then decreasing the magnitude of stylus deflection. Step (ii) may then advantageously comprise the step of performing an extrapolation, or other suitable mathematical operation, to calculate two or more measured points on the artefact surface. As explained previously elsewhere, the extrapolation process can be used to provide measured points on the surface of the artefact that correspond to zero stylus deflection. Herein, such a process is termed "extrapolate to zero" and provides a calculated position of the point on the surface of the artefact that is touched by the stylus in machine (e.g. x, y, z) co-ordinates.

The extrapolation process may be performed using the probe data and machine position data that are captured as the probe is moving towards and/or away from the artefact. Advantageously, the extrapolation process is performed using probe data and machine position data that are captured as the probe is moving away from the surface of the artefact. In this latter case, the measured points are unaffected by any stylus bounce or other effects that may be present when the stylus is initially driven into contact with the surface of the artefact.

It should be noted that although an extrapolation process is preferred when using a scanning probe, it is by no means an essential part of the present invention. The point at which the stylus contacts the surface of the artefact could be found in many different ways. For example, it is possible to monitor when the probe data exceeds a certain value thereby indicating that the stylus has been deflected by a certain amount.

If a contact measurement probe is provided, the stylus of that measurement probe is preferably brought into contact with each point on the surface of the artefact from a direction substantially perpendicular to the local surface of the artefact. This ensures that substantially all of the speed component is orthogonal to the artefact surface during the measurement and also that stylus contact with the same point on the artefact surface is maintained if the measurement probe is moved further toward the artefact after initial stylus contact (e.g. to perform an "extrapolate to zero" measurement). If a measurement probe approaches the artefact surface from a non-orthogonal direction, an orthogonal speed component can be readily derived from the known resultant speed and direction of probe incidence. Advantageously, such an orthogonal speed component is used in the delay calculation of step (ii).

Advantageously, step (ii) of the method comprises using the probe data and the machine position data to calculate the position of two or more measured points on the artefact surface. The measured points on the artefact surface are determined by appropriately combining the probe data with the machine position data. If a (contact) scanning probe is provided, this may be achieved using the extrapolate to zero method mentioned above. Alternatively, for non-contact measurement probes, the probe data and machine position data may be combined by a known technique.

Preferably, the two or more points on the surface of the artefact of step (i) of the method are selected to permit at least one dimension of the artefact to be measured. For example, the points may be selected to allow the diameter of a spherical artefact to be measured. Advantageously, the two or more points on the surface of the artefact comprise at least one pair of opposed points. The opposed points in a pair are points on the artefact surface that can be approached by moving the measurement probe along the same linear path in opposite directions.

If the two or more points on the surface of the artefact of step (i) are selected to permit at least one dimension of the artefact to be measured, step (ii) advantageously comprises calculating said delay by comparing at least one measured dimension of the artefact with a known (e.g. pre-measured) dimension of the artefact. In other words, the system delay can be found by comparing the measured dimension of an artefact with the known dimension of that artefact. This yields the system delay because the speed of the measurement probe is known.

Although it is possible to obtain artefacts having accurately known dimensions, the method of the present invention can also be used if the artefact dimensions are unknown. This has been found to be possible by advantageously performing step (i) a plurality of times with the measurement probe being moved at a plurality of different, known, speeds. Conveniently, each repetition of step (i) measures the same at least two points on the artefact surface. It should be noted that the repetition of step (i) may be implemented in various ways. For example, a first point on the artefact surface may be measured when moving the measurement probe at first, second and possibly subsequent speeds. A second point on the artefact surface may then be measured at these first, second and subsequent speeds. Alternatively, all or some of the points on the artefact surface may be measured at a first speed before repeating the measurements at a second speed. In other words, the specific order of the measurements is not important and can be selected as required to minimise the time needed to perform the calibration for the particular type of apparatus being used.

Advantageously, step (ii) comprises determining at least one measured dimension of the artefact at each of said plurality of speeds. For example, the diameter of a sphere may be calculated for each of the plurality of known measurement speeds. In particular, step (ii) may advantageously comprise determining the delay between the probe data and the machine position data from variations in the at least one measured dimension of the artefact as a function of speed. Preferably, the delay is obtained from the gradient of the at least one measured dimension versus speed data. This would allow, taking the above example, the system delay to be found from the gradient of measured sphere diameter as a function of the speed of movement of the measurement probe relative to the spherical artefact. Importantly, the actual dimension of the artefact does not need to be known or pre-measured when such a method is used.

The artefact may be any suitable shape and may be placed or formed within the machine working space. Advantageously, the artefact comprises a sphere, a pair of parallel plates or a cube. If a spherical artefact is provided, step (i) may conveniently comprise collecting probe data indicative of the position of at least five points on the surface of the artefact. Conveniently, five points on the sphere are measured; this permits sphere diameter to be measured with a high accuracy in minimal time.

Instead of determining measured points on the surface of the artefact, the machine position data and probe data that are captured may be analysed directly to obtain the system delay. Advantageously, step (i) comprises moving the measurement probe along a path that permits a plurality of points along a surface contour of the artefact to be measured. In particular, a large number (e.g. several tens or hundreds) of probe data values and machine position values may be captured as the measurement probe is driven along the measurement path. For example, at least ten or at least one hundred sets of such data values may be captured. If a scanning probe having a deflectable stylus is provided, the measurement probe may be moved along a path that causes the stylus tip to be scanned along the surface of the artefact.

Conveniently, the path includes at least one change in the direction of measurement probe movement that can be identified from both the machine position data and the probe data. Advantageously, the path includes a plurality of changes in the direction of probe movement that can be identified from both the machine position data and probe data. The surface contour scan is preferably performed a plurality of times at different speeds. Each scan preferably causes movement of the measurement probe along the same path, albeit at a different speed.

Advantageously, step (ii) comprises comparing the machine position data and the probe data to establish the delay therebetween, said comparison comprising an iterative process to minimise differences between the changes in direction identifiable from the probe data and machine position data. In other words, transitions in the machine position data and probe data that correspond to changes in probe directions are compared and the difference between the data sets are minimised by iteratively varying the delay between the probe data and machine position data sets. Alternatively, correlation techniques may be used; e.g. the probe and machine position data sets may be multiplied together and the resulting total maximised using an iterative process. Such an iterative process may be performed in parallel on machine position and probe data that are captured at different measurement speeds. In such a case, the resultant error may be minimised. This allows the system delay to be established without actually having to calculate positions on the artefact surface, although this could also be done if required.

The measurement probe may be moved relative to a stationary artefact, the artefact may be moved relative to a stationary measurement probe or the measurement probe and artefact may both be separately movable. All that is required is to know the relative speed between the measurement probe and the artefact; as mentioned above the known speed may be a measured or commanded speed. The machine may also comprise motors or other actuators that provide the relative movement between the artefact and measurement probe. Conveniently, the machine is a machine tool; i.e. a machine that can use tools to cut or turn features in workpieces. The machine tool may comprise a numeric controller (NC) that outputs machine position data that may be acquired from position encoders or the like. The NC may also control the relative movement between the measurement probe and the artefact.

Advantageously, the measurement probe outputs the probe data over a wireless link to a probe interface. Preferably, a computer is provided to perform step (ii) of the method For example, a computer may be interfaced to the NC of a machine tool and also to a remote probe interface that communicates with the measurement probe over a wireless link.

Advantageously, the machine position data and probe data are captured at intervals timed relative to a master clock. The system delay determined by the method of the present invention is then the relative delay between the generation of the machine position data by the machine and the probe data by the measurement probe; i.e. the system delay is the delay that occurs up to the instant when the data are time stamped relative to the master clock. Any subsequent delays, including variable delays associated with passing data in packets to a computer, that occur after the data has been time stamped relative to the master clock do not effect the measurement accuracy. Advantageously, a master clock is provided as part of the machine or the measurement probe system (e.g. in a probe interface). The other of the machine or measurement probe system is advantageously configured to have an input for receiving timing signals from the master clock. Provision and use of such a master clock arrangement has been described previously in more detail in WO2005/065884.

After performing the calibration to establish the system delay, the calculated system delay value may be used when combining machine position data with probe data. For example, the timings of the machine position data or probe data may be shifted or offset before calculating positional information. Alternatively, one of the measurement probe or machine may be arranged to provide a delay in data capture corresponding to the system delay. In this manner, future capture of machine position and probe data will have no relative system delay associated therewith.

According to a second aspect of the invention, apparatus comprises; a measurement probe being arranged to capture probe data indicative of the position of a surface relative to the measurement probe; a machine being arranged to capture machine position data indicative of the position of the measurement probe relative to an artefact located within the working area of the machine; a controller comprising calibration means for moving the measurement probe at a known speed relative to the artefact whilst capturing probe data and machine position data, the calibration means moving the measurement probe along a path that enables the capture of probe data indicative of the position of two or more points on the surface of the artefact relative to the measurement probe; wherein the controller comprises an analyser for determining the relative delay in capturing the probe data and the machine position data.

According to a third aspect of the invention, a method is provided for calibrating apparatus comprising a measurement probe mounted on a machine, the machine being arranged to capture machine position data indicative of the position of the measurement probe relative to an artefact, the measurement probe being arranged to capture probe data indicative of the position of a surface relative to the measurement probe, the method comprising the steps of; (i) taking probe data and machine position data captured as a measurement probe is moved at a known speed relative to an artefact, said probe data and machine position data being captured at known time intervals as the measurement probe is moved relative to an artefact along a path that allows probe data to be captured that is indicative of the position of two or more points on the surface of the artefact relative to the measurement probe; and (ii) analysing the machine position data and the probe data captured during step (i) and determining therefrom the relative delay in capturing probe data and machine position data. Advantageously, the machine position data values and probe data values used in step (i) are time stamped relative to a common clock.

A computer program may also be provided for performing the above described method. A computer program carrier may be provided for carrying such a computer program.

According to a fourth aspect of the invention, a method is provided for calibrating apparatus comprising a measurement probe mounted on a machine, the machine being arranged to capture machine position data indicative of the position of the measurement probe relative to an artefact, the measurement probe being arranged to capture probe data indicative of the position of a surface relative to the measurement probe, the method comprising the steps of; (i) moving the measurement probe at a known speed relative to the artefact whilst capturing probe data and machine position data, the measurement probe being moved along a path that enables the capture of probe data indicative of the position of at least one point on the surface of the artefact relative to the measurement probe, the path also including at least one change in the direction of probe movement that can be identified from the machine position data and the probe data; and (ii) comparing the machine position data and probe data captured during the scan of step (i) and determining therefrom the relative time delay in capturing machine position data and probe data.

Figure 2B:
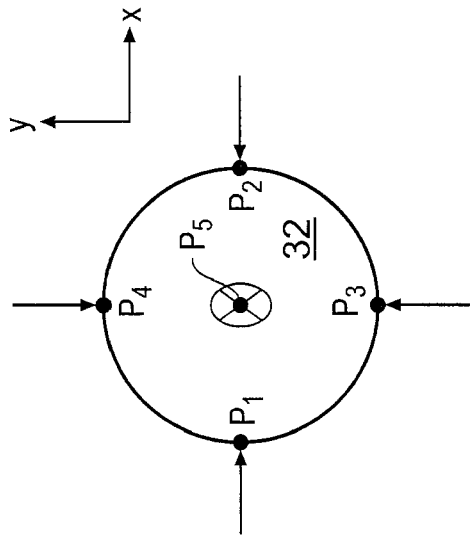
Figure 2C:
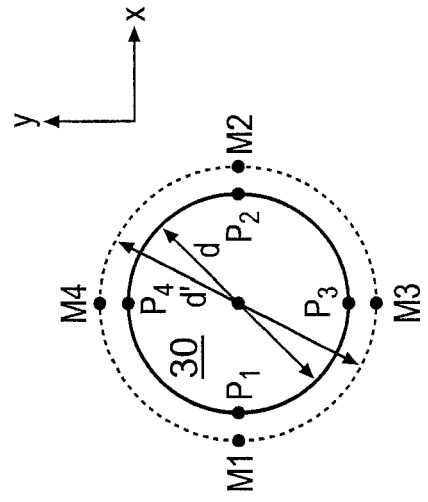
Figure 2A:
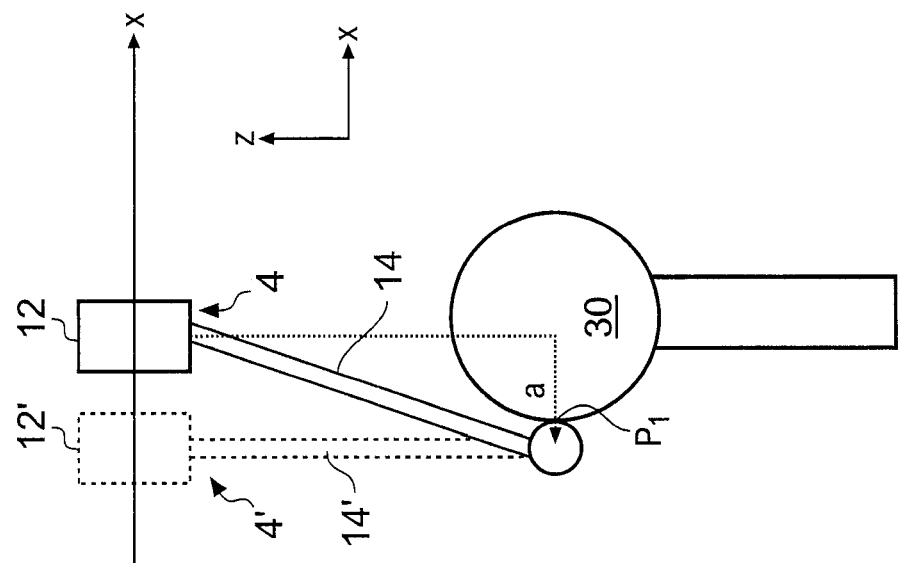
Figure 3:
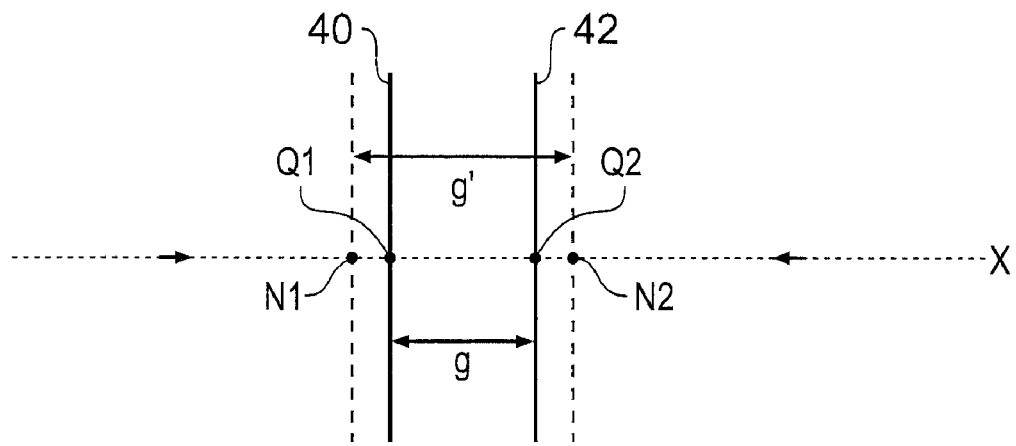
Figure 4:
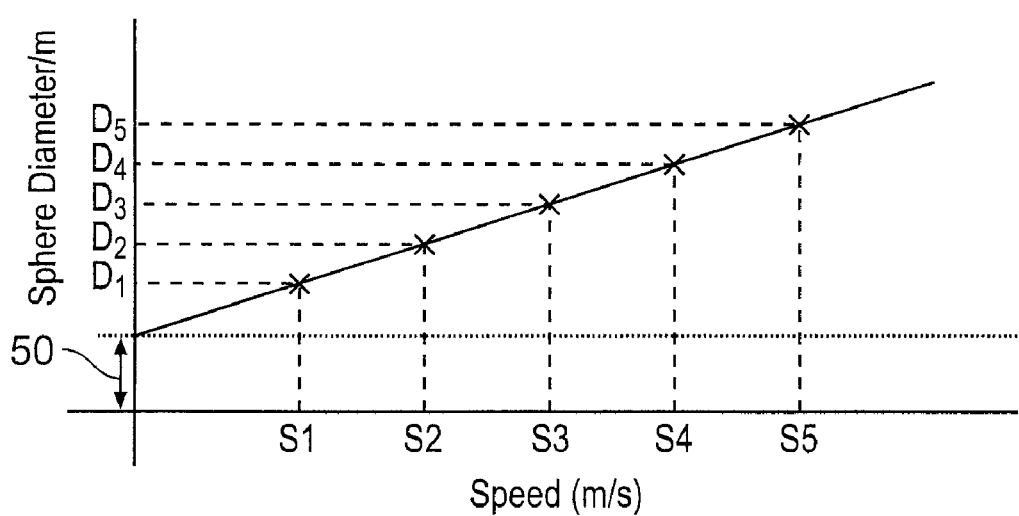
Figure 5:
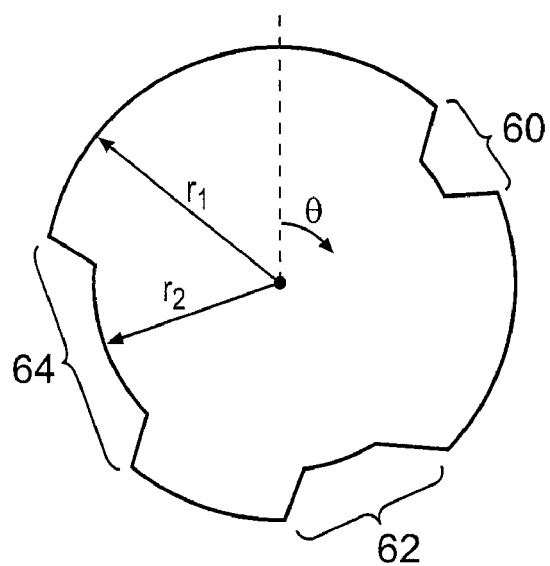
Figure 6:
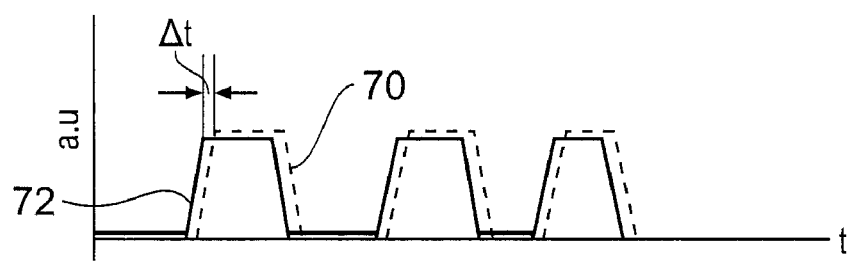
Figure 7:
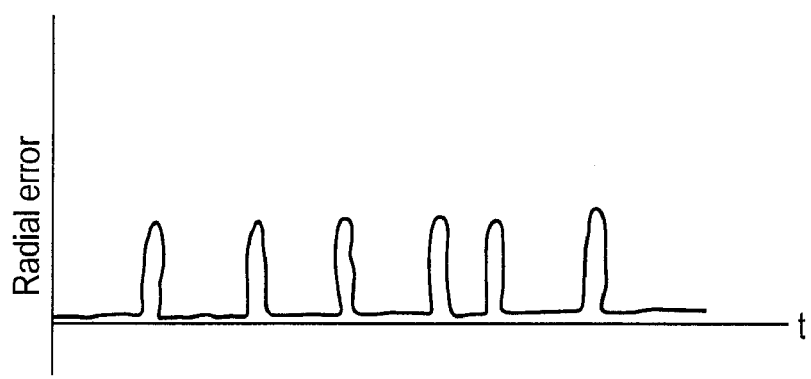
Figure 8:
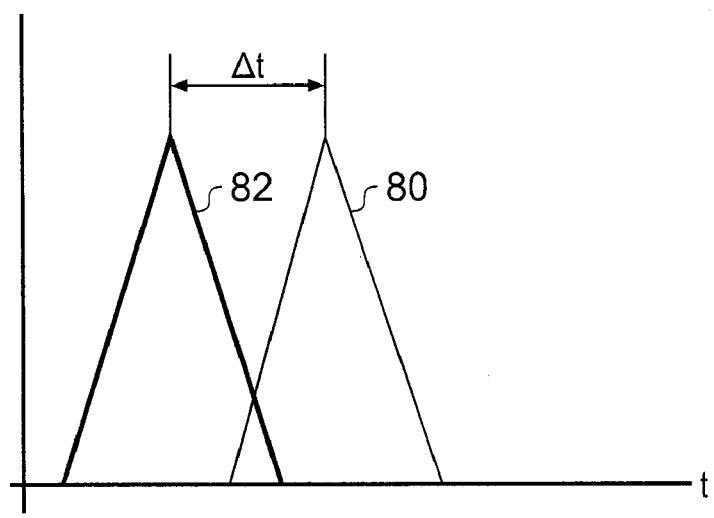

The invention will now be described, by way of example only, with reference to the accompanying drawings in which;

FIG. 1 illustrates a scanning probe mounted in the spindle of a machine tool,

FIG. 2 shows how the diameter of a spherical calibration artefact may be determined using five surface position measurements, FIG. 3 illustrates an alternative calibration artefact, FIG. 4 shows sphere diameter data acquired at a plurality of different measurement speeds, FIG. 5 illustrates a scanning path for scanning a sphere to find the system delay, FIG. 6 shows the machine position data and probe data produced whilst scanning a sphere using the path shown in FIG. 5, FIG. 7 shows the radial error of the machine and probe data of FIG. 6, and FIG. 8 illustrates how machine and probe data acquired whilst driving a probe into and out of a surface can be used to calculate the probe/machine timing delay.

Referring to FIG. 1, a scanning probe 4 mounted in the spindle 2 of a machine tool is schematically illustrated. The spindle 2 can be moved along the X, Y and Z machine tool axes relative to a fixed base 6 by various drive motors (not shown). The location of the spindle (in x, y and z) is also accurately measured using position encoders or the like (not shown). A numeric controller (NC) 8 outputs MOVE (X,Y,Z) signals to the drive motors and also receives positional information signals (x,y,z) from the position encoders. In a known manner, the NC can thus provide accurate servo-controlled movement of the spindle within the working space of the machine tool. The NC 8 is programmable via an application programmable interface (API) 10.

The analogue or scanning probe 4 comprises a probe body 12 that is attached to the spindle 2 of the machine tool using a releasable connector of standard type. A workpiece contacting stylus 14, having a stylus ball 16 at its tip, protrudes from the probe body 12. The analogue probe 4 measures any deflections of the tip of the stylus 14 relative to the probe body 12; these measurement are made in the so-called probe geometry system (a,b,c). The probe 4 also comprises an optical transmitter/receiver portion 18 that communicates with a corresponding receiver/transmitter portion of a remote probe interface 20 located in the vicinity of the machine tool. Probe deflection (a,b,c) data can thus be output to the interface via a wireless communications link whenever required. For example, probe deflection data may be transmitted by the probe whenever requested by the probe interface 20.

As described previously in WO2005/065884, a master clock 22 may be provided in the NC 8. Position measurements derived from the signals produced by the position encoders of the machine tool, may be captured and output via the API at time intervals defined by the master clock. In this manner, tabulated sets of machine position data (x,y,z) captured at known time intervals are produced. A timing or synchronisation signal from the master clock 22 of the NC is also passed to the probe interface 20. Probe deflection data (a,b,c) is also acquired at time intervals defined by the master clock 22. Tabulated sets of probe deflection data (a,b,c) captured at said known time intervals are output by the probe interface 20.

Although the probe deflection (a,b,c) and machine position (x,y,z) data values are preferably captured at the same instants of time, this is by no means essential. For example, the rate of collection of probe deflection data may be different to that of the machine position data. In this example, the master clock is shown as part of the NC. However, it may alternatively be located in the probe interface or a common timing signal may be provided to both the probe interface and NC from an external source.

A computer 24 receives the machine position data from the API 10 and the probe deflection data from the probe interface 20. As the machine position measurements (x,y,z) and the probe deflection measurements (a,b,c) are both time stamped relative to the master clock 22, these measurements can be combined by the computer 24 to provide co-ordinate position measurements of the surface being scanned. If the data values were acquired at different time intervals, an interpolation process may be performed on one of the probe deflection data or machine position data sets to temporally align it with the other data set. The use of a common clock to define timings of both the probe deflection and machine position data has the advantage of making the system insensitive to the relative speed of data transfer from the NC and probe interface to the computer 24. The inability to access position data in real time from currently available NCs is thus overcome.

The use of a master clock technique ensures that calculated machine position (x,y,z) and probe deflection (a,b,c) data values are not affected by the variable delays that exist in passing data sets to the PC from the NC and probe interface respectively. However, there is still a relative delay associated with capturing the machine position and probe deflection values. For example, the NC may take several milliseconds to calculate machine position data from the encoder signals whereas the probe interface may take only a few microseconds to interrogate the measurement probe and receive updated probe deflection data. It can thus be seen that although the machine position and probe deflection values can be captured by the machine and probe interface at a known point in time (i.e. as timed relative to the master clock), these values may actually relate to slightly different real times of measurement. In other words, although the machine position and probe deflection data values can be read (i.e. captured) at time intervals defined by a common clock, there may still be a relative delay in generating the machine position and probe deflection measurement values. Herein, this delay is called the "system delay" and various methods for determining this system delay in accordance with the present invention will now be described.

At this point it is convenient to note that although it is preferable for both probe deflection and machine position data sets to be timed relative to a common clock when using apparatus of the type shown in FIG. 1, this may not be the case for all types of apparatus. For example, the probe interface and NC may contain separate, high accuracy, clocks that remain synchronised over long periods of time. Alternatively, means could be provided for monitoring the relative timings of two different clocks. Furthermore, if the machine position and probe deflection data reaches the processor without there being any kind of variable delay (e.g. from an NC or data transfer means) the use of master clock arrangement is unnecessary.

Referring to FIGS. 1 and 2, a method for calculating the system delay using a sphere of known diameter will be described.

As shown in FIG. 1, a sphere 30 of diameter d is placed in the working volume of the machine. As shown in FIG. 2a, the measurement probe 4 is then driven along the x-axis of the machine so that the stylus ball 16 contacts a first point (P1) on the surface of the sphere 30. The measurement probe is then driven along the X-axis for a short distance after contact with the sphere surface has been established; e.g. until the probe has reached its predetermined maximum stylus deflection. The probe direction is then reversed and a series of probe deflection (a,b,c) and machine position (x,y,z) data values, all time stamped relative to the master clock, are captured as the probe is moved away from the sphere at a known, substantially constant, speed (S1).

The probe and machine position data values are combined by the computer 24. In particular, the computer 24 performs an "extrapolate to zero" calculation to find a measured point M1 on the sphere surface. As described previously elsewhere (e.g. U.S. Pat. No. 6,810,597), an extrapolate to zero technique involves analysing probe deflection data as a function of machine position when the stylus is in contact with a point on the surface to be measured. An extrapolation may then be performed to determine the machine position where the stylus contacts the surface but there is still zero stylus deflection. Using the extrapolation to zero technique means that the measured point M1 is substantially unaffected by stylus or machine distortions. It should be noted that the measurements used in the extrapolate to zero calculation are preferably those taken as the probe is moved away from the sphere (i.e. as the stylus is brought out of contact with the surface). Such probe deflection measurements do not suffer from bounce or vibration effects that may degrade deflection measurements acquired when driving a stylus into a surface.

Although extrapolation to zero techniques can be used to obtain high accuracy surface position data from scanning probes, it should be noted that the method could use alternative techniques to determine the measured point M1. For example, an interpolation technique of the type described in U.S. Pat. No. 6,810,597 could be used. Alternatively, a simple trigger signal could be issued when the probe deflection data exceeds a certain threshold.

As shown in FIG. 2b, the measurement process is repeated four times with the probe stylus being driven into contact with points P2, P3, P4 and P5 of the sphere. Further extrapolation to zero calculations yield measured points M2, M3, M4 and M5. All measurement M1-M5 are made with the probe being driven away from the sphere surface at the same (known) speed S1.

The five measurements M1-M5 of points on the sphere surface allow the measured sphere diameter d' to be calculated in a known manner from the mathematical properties of a sphere. However, any system delay will have offset all of the measurements M1-M5 by a fixed amount that is dependent predominantly on the (known) measurement speed and the (unknown) system delay. Assuming the machine position data is delayed relative to the probe deflection data, the measured sphere diameter d' will be greater than the known sphere diameter d as illustrated in FIG. 2c. The difference between the known and measured sphere diameters Δd can thus be divided by twice the measurement speed S1 to yield the system delay value.

Although measuring the sphere at five point allows reliable sphere diameter values to be determined, it is possible to determine the sphere diameter using more than five measurement points or less than five points. For example, two or more measurement points may be used. It should also be noted that the points measured on the sphere (P1-P5) in the present example are chosen purely for mathematical simplicity. P1 and P2 are selected so that the probe can be driven only along the X-axis and so that the associated stylus deflection is purely along the a-axis of the probe. Similarly, points P3 and P4 are approached along the Y-axis of the machine and the stylus is deflected only about its b-axis. Finally, point P5 is approached along the Z axis and causes probe deflection only along the c-axis of the probe. If desired, any point on the sphere surface could be measured and resultant machine position and probe deflection values determined from combining multiple axes values. Similarly, the probe and machine coordinate systems need not be aligned as shown. In fact, different co-ordinate systems could be used for the machine position and probe deflection measurements and suitable transformations could be performed subsequently during data processing.

Although a sphere of the kind described above provides a convenient artefact on which to perform the system delay determination method, many alternative artefacts could be used. In fact, any artefact could be used that has a known dimension. For example, the artefact could be a cube, cylinder, bore etc. The artefact could be placed onto the machine tool when required, permanently attached to the machine tool or could even be part of the machine tool.

FIG. 3 illustrates how the method could be implemented using a pair of parallel plates 40 and 42 spaced apart by a known gap g. The measurement probe could be driven along the X-axis in the positive and negative directions so that stylus contact is made at point Q1 on plate 40 and point Q2 on plate 42. For both measurements, the speed of the measurement probe is known and constant. Using the extrapolate to zero technique (as mentioned above) on data captured as the stylus is withdrawn from the surface, the position of two surface contact points N1 and N2 can be calculated from which an inter-plate gap value g' can be found. The difference between the (known) inter-plate gap g and the calculated gap value g' can be combined with the known measurement speed to determine the system delay.

In the examples given above, the probe movement whilst taking measurements is along a direction normal to the surface of the calibration artefact. It is, however, possible for the probe to be driven into the surface from a non-orthogonal direction. In such a case, the component of speed that is normal to the surface can be resolved and used to estimate the system delay. The examples given herein also assume that the x, y and z machine position values are generated with the same delay. This may, for certain types of machines, not be the case. The method could thus be used to provide separate measurements of the dimensions of an artefact along different machine axes. For example, the diameter of a sphere could be separately measured using pairs of opposed measurements in which the probe is moved along a certain axes. In such an example, system delays could be separately calculated for one or more of the x, y and z machine position measurements.

The methods described with reference to FIGS. 2 and 3 above rely on a dimension of the artefact (e.g. sphere diameter) being known. However, this is not always possible or practical. For example, the dimensions of an artefact may only be known at a certain temperature. However, it has been found that taking measurements at different speeds can overcome the need to accurately know a dimension of the artefact.

As described above with reference to FIG. 2, sphere diameter can be reliably determined from five measurement points on the sphere surface. In the example described above, all of these five measurements are taken with the probe moving at a known speed (S1). In order to overcome the need to compare the measured sphere diameter to a known sphere diameter, the sphere diameter can be measured multiple times with the probe moving at different (known) speeds. For example, five touches on the sphere at speed S1 may be used to obtain a diameter value D1. Five touches on the sphere at speed S2 may then be used to obtain a diameter value D2. This may be repeated multiple times; e.g. at speeds S3, S4 and S5 to provide measured diameter values D3, D4 and D5.

As shown in FIG. 4, the greater the measurement speed, the greater the calculated sphere diameter. This is due to the system delay having a greater proportional effect on calculated sphere diameter as the measurement speed increases. The system delay is the dominant speed dependent variable and hence the gradient of the measured sphere diameter versus measurement speed plot gives the system delay. As an aside, the intercept 50 of the plot also provides a measure of static error values.

The above methods use multiple measurement points to calculate a plurality of co-ordinates on the artefact surface thereby allowing a dimension of the artefact to be measured. Measuring a dimension of an artefact (e.g. diameter, inter-plate gap etc) in this manner means that the precise position of a point on a surface does not need to be known. It has also been found possible to determine the system delay from the machine position and stylus deflection data without actually calculating the position of any points on the surface of the artefact. This will now be described in more detail with reference to FIG. 5 to 8.

Referring to FIG. 5, a scanning path for scanning for scanning around the circumference of a sphere is shown. The scanning path is selected so that stylus contact is maintained with the surface of the sphere during the entire scan. During the scan, the probe is moved between a path having a first scan radius r1 and a second scan radius r2 where r2 is less than r1. The sphere surface being measured is perfectly circular and hence the different radii of scan path results in different stylus deflections. In particular, it can also be seen that the probe is moved along the scan radius r2 during a first scan segment 60, a second scan segment 62 and a third scan segment 64. The first, second and third scan segments are of increasing angular size and are also interspersed by first scan radius segments of different angular size.

FIG. 6 shows the machine position data 70 captured by the machine tool and the stylus deflection data 72 as a function of time (time being measured relative to the master clock) as the measurement probe is passed along the scan path shown in FIG. 5. The measured values of the two data sets are scaled appropriately to facilitate ready comparison. It can be seen from the step changes in the plots of FIG. 6 that the stylus deflection data leads the machine position data by a value $\Delta t$. The value $\Delta t$ corresponds to the system delay.

FIG. 7 shows the difference between the machine position data 70 and the probe deflection data 72. This difference is termed the radial error. An iterative optimisation technique is used to find the time delay that can be applied to the stylus deflection data 72 to minimise the radial error. The use of different size angular segments as shown in FIG. 5 removes any degeneracy in the optimisation process permitting the unique solution to be reliably found. A least sum of squares minimisation process has been found to be suitable for such error minimisation, but numerous alternative mathematical techniques (e.g. correlation techniques etc) are known which could perform a similar function.

The method described with reference to FIGS. 5 to 7 is advantageous as it uses a large number of stylus and machine position measurement points when calculating the delay. It is, however, also possible to determine the delay by driving the stylus into and back out of contact with a single point on a surface at a known speed.

FIG. 8 shows the machine position data 80 and the stylus deflection data 82 as a the stylus is driven into a point on a surface and then withdrawn therefrom. The inward and outward motion is performed at the same, known, speed thus allowing the system delay $\Delta t$ to be established from the separation in the maxima in the machine position and stylus deflection data sets.

The system delay of a particular set-up is unlikely to change significantly over time. However, the above described methods may be performed as often as required. For example, any of the above described methods may be perform only once to calculate system delay during initial machine set-up, periodically as part of a calibration routine or prior to taking each set of measurements. The frequency with which the system delay is found will thus vary depending on the particular application.

The above described methods may be performed with the probe deflection and machine position data being corrected using previous system delay values; in such a case the method will determine any additional system delay that has been introduced since the prior system delay measurement. Alternatively, any prior system delay compensation may be deactivated when performing the method so that the full system delay is determined from scratch.

Finally, it should be remembered that the above described embodiments are only examples of the present invention. Many variations to these specific examples would be apparent to the skilled person. For example, the machine tool described above has linear, mutually orthogonal, axes of movement and measurement but this is by no means essential. Non-Cartesian machines (e.g. tripod or hexapod type arrangements) could be used. Similarly, there is no requirement for the probe to always output stylus deflection data in Cartesian co-ordinates. Furthermore, although an analogue measurement probe is described above the technique could be applied to other types of measurement probe. For example, the method could be used with non-contact (e.g. optical) measurement probes or the like.

The invention claimed is:

1. A method for calibrating apparatus comprising a measurement probe mounted on a machine, the machine being arranged to capture machine position data indicative of the position of the measurement probe relative to an artefact, the measurement probe being arranged to capture probe data indicative of the position of a surface relative to the measurement probe, the method comprising the steps of;
   (i) moving the measurement probe at a known speed relative to the artefact whilst capturing probe data and machine position data, the measurement probe being moved along a path that enables probe data to be captured that is indicative of the position of two or more points on the surface of the artefact relative to the measurement probe; and
   (ii) analysing the machine position data and the probe data captured during step (i) and determining therefrom the relative delay in capturing probe data and machine position data.

2. A method according to claim 1, in which the measurement probe is a scanning probe having a deflectable stylus and the probe data is indicative of stylus deflection, wherein step (i) comprises using the machine to move the measurement probe along a path that causes the stylus of the measurement probe to be brought into contact with each of said two or more points on the surface of the artefact.

3. A method according to claim 2, wherein step (i) comprises continuing movement of the measurement probe relative to the artefact for a limited distance after initial contact between the stylus and a point on the surface of the artefact has been made and step (ii) comprises performing an extrapolation to calculate two or more measured points on the artefact surface.

4. A method according to claim 3, wherein the two or more measured points are derived from probe data and machine position data that are captured as the probe is being moved away from the surface of the artefact.

5. A method according to claim 2, wherein the stylus of the measurement probe is brought into contact with each point on the surface of the artefact from a direction substantially perpendicular to the surface of the artefact.

6. A method according to claim 1, wherein step (ii) comprises using the probe data and the machine position data to calculate the position of two or more measured points on the artefact surface.

7. A method according to claim 6, wherein the two or more points on the surface of the artefact of step (i) are selected to permit at least one dimension of the artefact to be measured.

8. A method according to claim 7, wherein step (ii) comprises calculating said delay by comparing the at least one measured dimension of the artefact with a known dimension of the artefact.

9. A method according to claim 6, wherein the two or more points on the surface of the artefact comprise at least one pair of opposed points.

10. A method according to claim 1, wherein step (i) is performed a plurality of times with the measurement probe being moved at a plurality of different known speeds.

11. A method according to claim 10, wherein step (ii) comprises determining at least one measured dimension of the artefact at each of said plurality of speeds and determining the delay between the probe data and the machine position data from said at least one measured dimension of the artefact as a function of speed.

12. A method according to claim 11, wherein the delay is determined from the gradient of measured dimension versus speed data.

13. A method according to claim 1, wherein the artefact comprises a sphere and step (i) comprises capturing probe data indicative of the position of at least five points on the surface of the sphere.

14. A method according to claim 1, wherein step (i) comprises moving the measurement probe along a path that permits a plurality of points along a surface contour of the artefact to be measured, wherein said path includes at least one change in the direction of measurement probe movement that can be identified from both the machine position data and the probe data.

15. A method according to claim 14, wherein said path includes a plurality of changes in the direction of probe movement that can be identified from both the machine position data and probe data.

16. A method according to claim 14, wherein step (ii) comprises comparing the machine position data and the probe data to establish the delay therebetween, said comparison comprising an iterative process to minimise differences between the changes in direction identifiable from the probe data and machine position data.

17. A method according to claim 1, wherein the machine position data and probe data are captured at intervals timed relative to a master clock.

18. A method according to claim 1, wherein the machine is a machine tool that comprises a numeric controller that outputs the machine position data.

19. A method according to claim 1, wherein the measurement probe outputs the probe data over a wireless link to a probe interface.

20. Apparatus comprising;
   a measurement probe for capturing probe data indicative of the position of a surface relative to the measurement probe;
   a machine for capturing machine position data indicative of the position of the measurement probe relative to an artefact located within the working area of the machine;

a controller comprising calibration means for moving the measurement probe at a known speed relative to the artefact whilst capturing probe data and machine position data, the calibration means moving the measurement probe along a path that enables the capture of probe data indicative of the position of two or more points on the surface of the artefact relative to the measurement probe;

wherein the controller comprises an analyser for determining the relative delay between the captured probe data and machine position data.

21. A method of calibrating apparatus comprising a measurement probe mounted on a machine, the machine being arranged to capture machine position data indicative of the position of the measurement probe relative to an artefact, the measurement probe being arranged to capture probe data indicative of the position of a surface relative to the measurement probe, the method comprising the steps of;

(i) moving the measurement probe at a known speed relative to the artefact whilst capturing probe data and machine position data, the measurement probe being moved along a path that enables the capture of probe data indicative of the position of at least one point on the surface of the artefact relative to the measurement probe, the path also including at least one change in the direction of probe movement that can be identified from the machine position data and the probe data; and (ii) comparing the machine position data and probe data captured during the scan of step (i) and determining therefrom the relative time delay in capturing machine position data and probe data.

* * * * *